United States Patent [19]

Fay

[11] Patent Number: 4,908,914
[45] Date of Patent: Mar. 20, 1990

[54] HOSE CLAMP WITH REPRODUCIBLE CLOSURE

[75] Inventor: Robert F. Fay, York, Pa.

[73] Assignee: Murray Corporation, Cockeysville, Md.

[21] Appl. No.: 338,313

[22] Filed: Apr. 14, 1989

[51] Int. Cl.⁴ .............................................. B65D 63/00
[52] U.S. Cl. ............................................ 24/283; 24/279
[58] Field of Search ................. 24/283, 282, 279, 484, 24/20 LS, 20 TT; 285/253

[56] References Cited

U.S. PATENT DOCUMENTS

| | | | |
|---|---|---|---|
| 427,709 | 5/1890 | Sherman | 24/279 |
| 2,536,612 | 1/1951 | Murray | 24/283 |
| 2,625,721 | 1/1953 | Lockhart | 24/279 |
| 2,915,800 | 12/1959 | Graef et al. | 24/279 |
| 4,489,464 | 12/1984 | Massari et al. | 24/279 |
| 4,516,296 | 5/1985 | Sherman | 24/279 |
| 4,592,576 | 6/1986 | Proctor et al. | 24/279 |
| 4,623,204 | 11/1986 | Auclair | 24/279 |
| 4,705,078 | 11/1987 | Montgomery | 24/279 |

FOREIGN PATENT DOCUMENTS

| | | | |
|---|---|---|---|
| 549701 | 2/1923 | France | 24/279 |
| 541613 | 12/1941 | United Kingdom | 24/283 |
| 1021277 | 3/1966 | United Kingdom | 24/279 |
| 2004939 | 4/1979 | United Kingdom | 24/279 |

Primary Examiner—Victor N. Sakran
Attorney, Agent, or Firm—Leonard Bloom

[57] ABSTRACT

A clamp to retain a hose on a conduit for reproducibly controlling the closure of the clamp to obtain a consistent diameter for the clamp. A spacer is removably carried by a screw on the clamp and is disposed between a nut means and a projecting portion of the loop of the clamp. Turning the screw in a closing direction reduces the diameter of the clamp by moving the projecting portion towards the nut means. The removable spacer limits movement and reproducibly defines the diameter, and hence the closure of the clamp. The removable spacer engages the body of the screw with a snap fit for easy installation and removal. The spacer further has a tab on a frontward face to prevent rotation of the spacer and to facilitate removal. The spacer further has a depression on a rearward face in which an instrument may be inserted to assist in removal of the spacer.

10 Claims, 4 Drawing Sheets

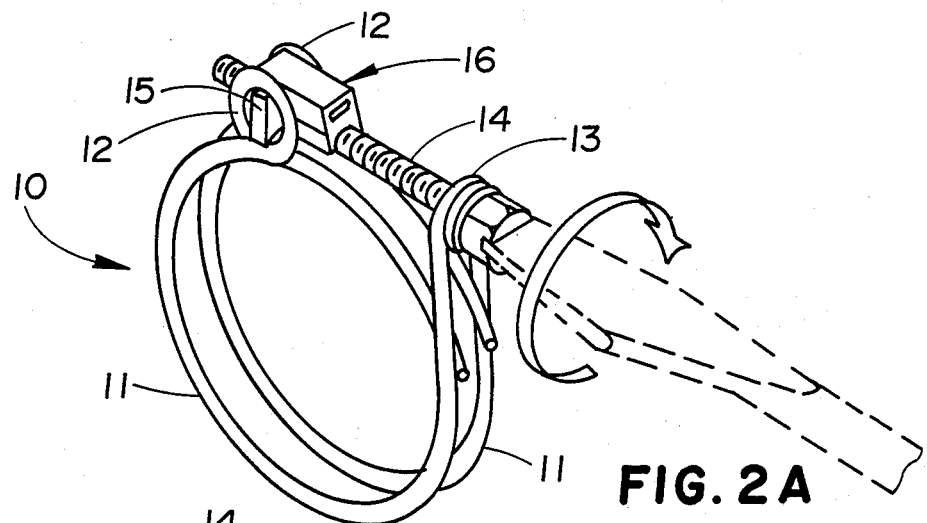
FIG. 2A
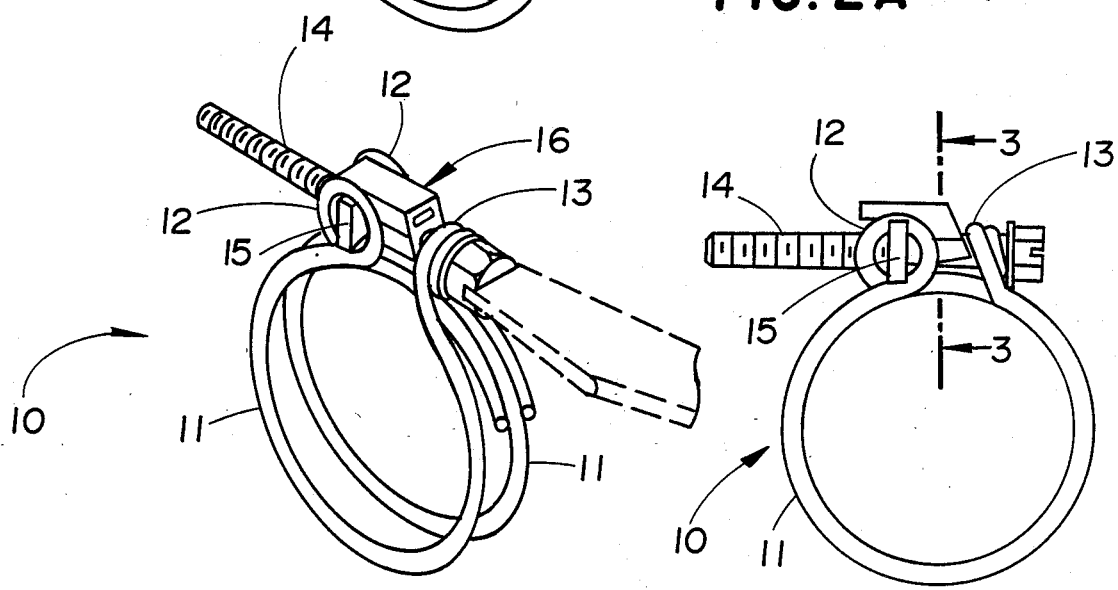
FIG. 2B
FIG. 2C
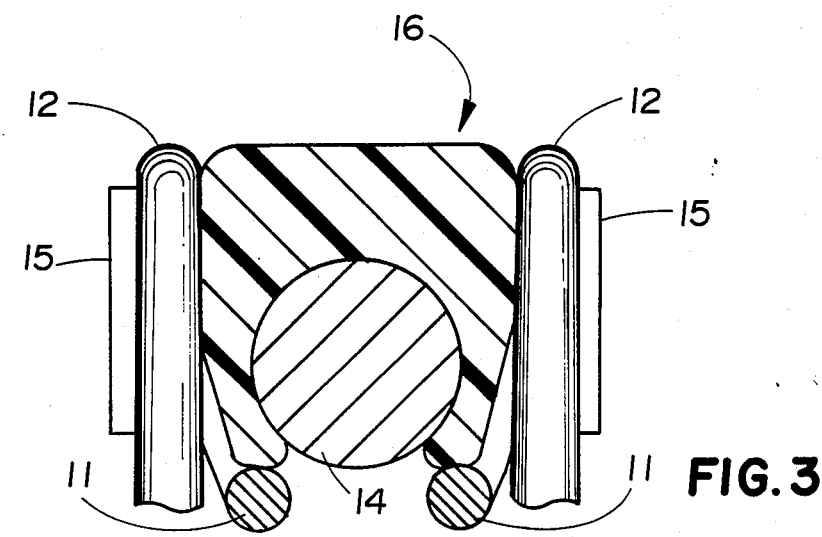
FIG. 3

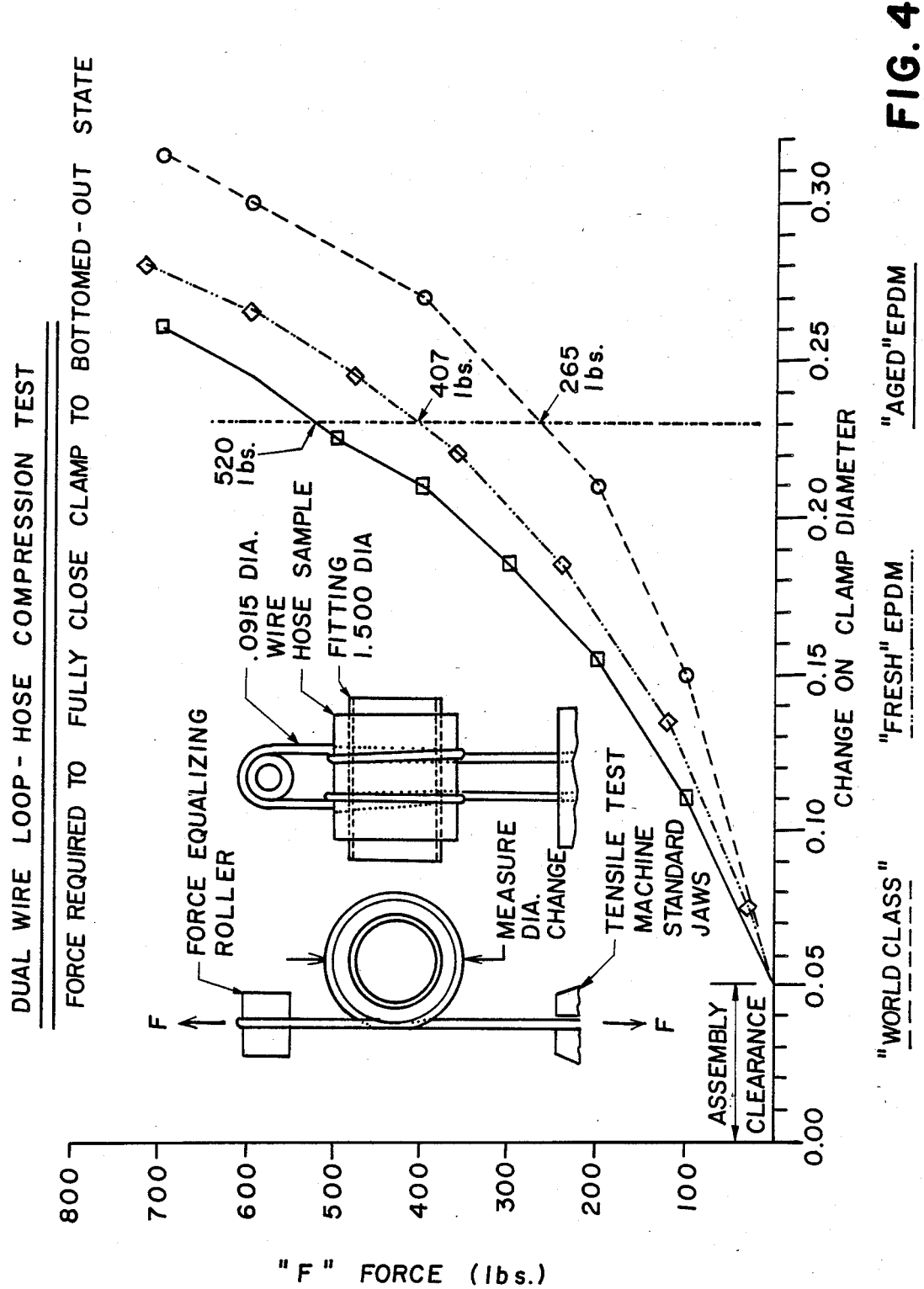

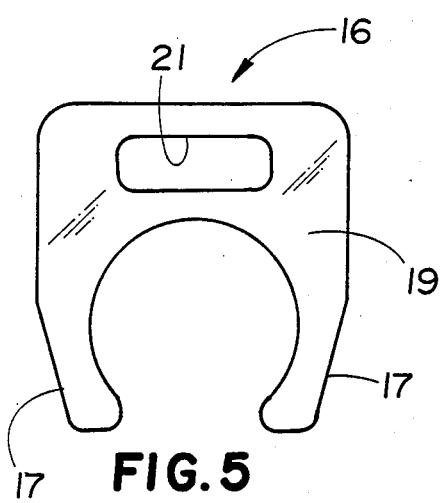
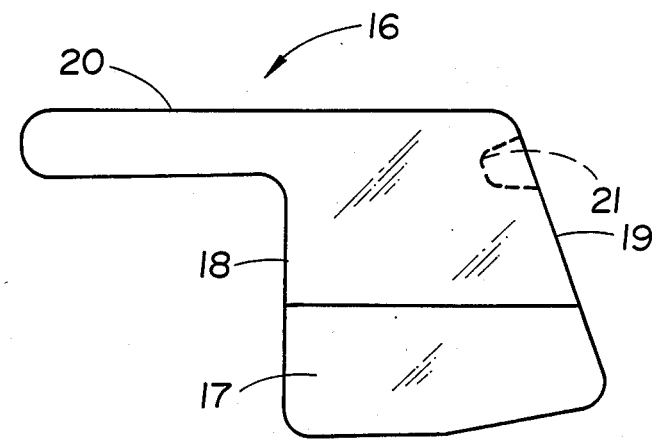
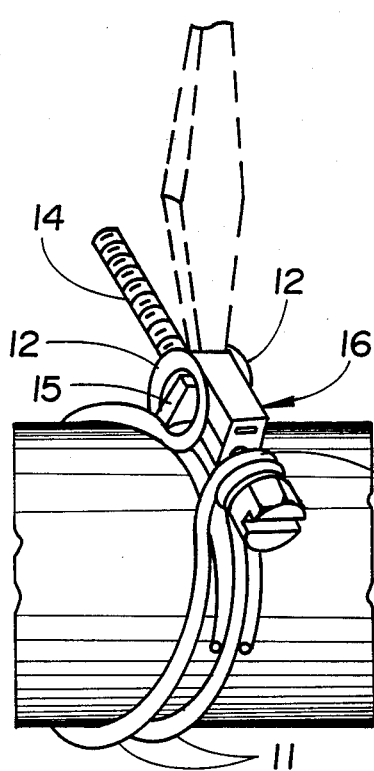
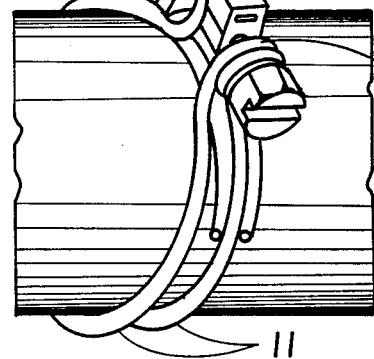
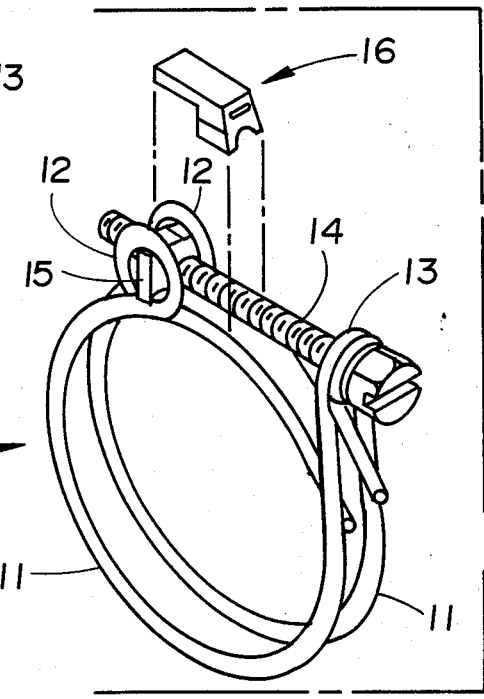

HOSE CLAMP WITH REPRODUCIBLE CLOSURE

FIELD OF THE INVENTION

The present invention relates to a clamp for hoses and the like; and more particularly, to a device for reproducibly controlling the closure of the clamp to obtain a consistent diameter for the clamp.

BACKGROUND OF THE INVENTION

Clamps to retain hoses and the like on conduit or rigid tubing are well known. These clamps generally comprise a flexible band which encircles the hose and a means for adjusting the degree of closure of the band about the hose. Examples of these found in U.S. Pat. No. 2,536,612 issued to Murray, and No. 4,489,464 issued to Massari et al. Other types of clamps include an electrical ground clamp, U.S. Pat. No. 4,623,204 issued to Auclair; and a pipe repair clamp, U.S. Pat. No. 4,705,078 issued to Montgomery.

While adequate for their intended purpose, none of these clamps discloses a means for maintaining a clamp with a consistent diameter and assuring a reproducible closure of the clamp.

In conventional applications, the clamp is installed by tightening the screw with a torque wrench, usually to about 30-38 in. lb. However, complaints of leaks are still received, and a study was conducted on approximately 4000 screws and nuts using a specialized fixture. It was found that using a constant input torque of 30 in. lbs., the force generated by these random screw/nut combinations varied between 100 and 700 pounds. It became apparent that there was considerable variability in the mating of the screw and the nut to the extent that it was impossible to use torque alone in order to obtain reproducibility in terms of the diameter of the clamp and the clamp's ability to secure the hose to the tubing. Another factor is the compressibility of the resilient hose and the force required to close the clamp over the hose. A wide range of force is required depending upon the hose material and the age of the hose. These factors further emphasize that the conventional method of applying a standard torque to tighten the hose clamp is an ineffective means of installing a hose clamp to assure an adequate seal.

Subsequent research into the screw/nut force output problem suggest that it is directly related to the sliding coefficient of friction and the microhardness of the zinc plating itself (zinc is the plating in general use on clamps). Compared to other platings, zinc has a very wide hardness range as shown in the following values:

| PLATING TYPE | MICROHARDNESS (Kg/sq.mm.) |
| --- | --- |
| lead | 5-20 |
| cadmium | 30-45 |
| zinc | 35-125+ |
| iron | 140-up |

Cadmium and lead have been used for references because they are both reknown for their high degrees of lubricity—lead much more so than cadmium. Also, they both demonstrate a significantly narrower range between limits compared to 90+ units for zinc. Iron has been included to give some perspective to the magnitude of the numbers and, also, because of the known galling and seizing that occurs between unlubricated iron/steel parts. Overall, the data suggests that zinc will at times possess a high degree of lubricity and at other times the lubricity will be significantly reduced. This characteristic trait has been born out by studies pertaining to the amount of force generated by randomly selected screw/nut combinations at constant input torque. Substitution of cadmium for zinc would still introduce a high degree of variability. Thus, it is apparent that torque alone is not an adequate installation procedure.

Another conventional means for installing a clamp is to examine the "gap" between the head of the screw and the nut when the screw is turned in a closing direction. Larger gaps are preferred by assembly line personnel in certain uses with the belief that additional adjustment is available. However, this is more probably an indication that minimal hose compression has been achieved and is a major factor in leak problems. On the other hand, fully bottomed-out clamps (i.e. maximum hose compression due to high force output in which the screw is fully turned in a closing direction) deprive the user of further means of adjustment. An "optimum size" has been considered to be that clamp diameter such that there are 3-4 full turns of the screw remaining before the clamp reaches its fully closed (bottomed-out) diameter.

Thus despite the availability of clamps, there remains a need to provide a clamp having a closure which produces a predictable and consistent diameter and which can be installed easily to assure an effective seal.

SUMMARY OF THE INVENTION

A primary object of the invention is to alleviate the deficiencies and disadvantages of the prior art by providing a device with a reproducible closure and a consistent diameter.

It is another object of the present invention to provide a clamp in which an adjusting screw may be turned in a closing direction to reproducibly secure the clamp on a hose.

It is still another object of the present invention to provide a spacer to engage an adjusting screw on a clamp to control the degree of closing of the clamp.

It is yet another object of the present invention to provide such a spacer which can easily be installed and removed from the clamp.

It is a further object of the present invention to provide a visual reference for users to determine proper installation of the clamp.

In accordance with the teachings of the present invention, there is disclosed a clamp to retain a hose on a conduit, the clamp having a body section forming a closed loop and the loop having a diameter. The body section has a radially projecting portion. Also the clamp includes a screw having a threaded body and a head. The head of the screw is received by the radially projecting portion and bears on this portion. The closed loop further has a nut means attached to the loop and spaced apart from the projecting portion. The nut means cooperates with the threaded body of the screw such that rotation of the screw in a closing direction moves the projecting portion and the head of the screw towards the nut means. This reduces the diameter of the loop. A spacer is removably carried by the body of the screw. This spacer is disposed adjacent to the nut means such that when the screw is rotated in a closing direction, the head of the screw and the projecting portion of the body section on which the head of the screw bears engage the spacer to limit further movement of the end of the projecting portion. This reproducibly defines the diameter of the closed loop. In this manner, the hose is securely retained to prevent leakage caused by the diameter being substantially larger than the hose and to prevent damage to the hose caused by the diameter being substantially smaller than the hose.

The spacer removably carried by the screw has a pair of resilient legs which partially define a cylindrical bore, such that the legs may straddle the body of the screw.

The spacer engages the body of the screw with a snap fit, such that the spacer may be easily and rapidly installed and may be removed for subsequent readjustment of the screw if desired without removing the screw from the engagement with the nut means. The spacer further serves to prevent loss of the screw during transit and handling.

These and other objects and advantages of the present invention will become apparent from a reading of the description of the device contained herein, taken in conjunction with the enclosed drawings.

BRIEF DESCRIPTION OF THE DRAWINGS

FIG. 2A is a perspective view of a clamp including the instant invention showing turning of the screw in a closing direction.

FIG. 2B is a perspective view of a clamp including the instant invention showing the screw in a closed position such that the diameter of the clamp is consistent.

FIG. 2C is a side view of the instant invention showing the spacer limiting the closure of the clamp to a reproducible diameter.

FIG. 3 is a cross section taken across the lines 3—3 of FIG. 2C showing the legs of the spacer engaging the screw in a snap lock and also showing the spacer disposed between the spaced loops.

FIG. 4 is a schematic illustration of a test fixture for hose compression of a clamp, together with a graph of data showing the relation of force to change in clamp diameter for three types of hose materials.

FIG. 5 is an end view showing the rearward face of the spacer and the legs of the spacer.

FIG. 6 is a side view of the spacer showing the tab and body indicating, in broken lines, the depression in the rearward face.

FIG. 7 is a top view of the spacer showing the rearward face, the legs and the depression.

FIG. 8 is a perspective view of the clamp disposed over a hose and showing a screw driver being used to remove the tab from the clamp.

FIG. 9 is a perspective view of the clamp of the present invention showing the engaging of the spacer with the screw while the clamp is in an open position.

BRIEF DESCRIPTION OF THE PREFERRED EMBODIMENT

Figure 1A:
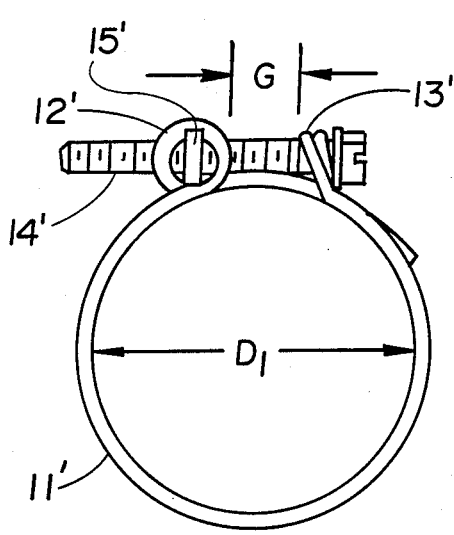
FIG. 1A is a side view of the prior art showing the screw in an open position.
Figure 1B:
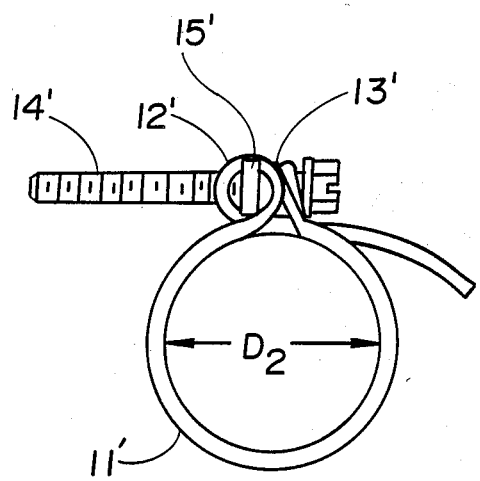
FIG. 1B is a side view of the prior art of FIG. 1A showing the screw in a closed position with the diameter of the clamp being reduced with respect to FIG. 1A.
Figure 1C:
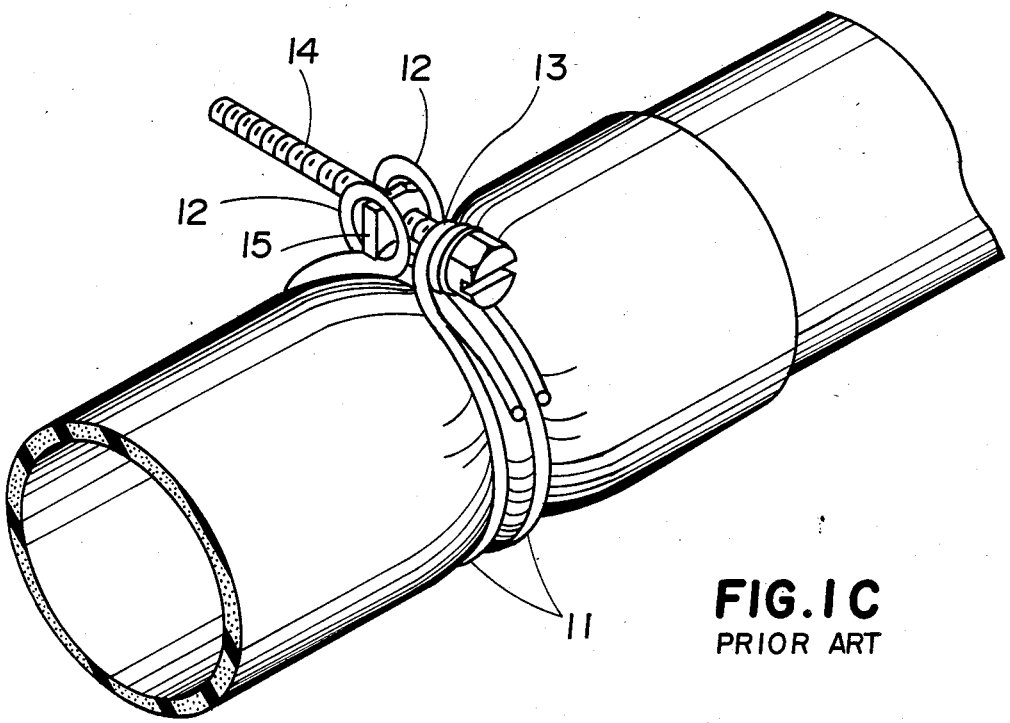
FIG. 1C is a perspective view of the prior art showing the clamp over tightened and damaging the hose on the conduit.

FIGS. 1A and 1B show the prior art. The clamp has a diameter $D_1$ which is determined by the turning of the screw 14. In conventional clamp practice, the screw 14' is turned until a gap G is obtained. This gap G is not accurately measured, nor is it sufficiently reproducible to assure that the diameter $D_1$ is consistent from clamp to clamp. Also, it is possible to turn the screw 14' until the helix 13' engages the nut 15'. This is defined as "bottomed-out". In this "bottomed-out" position, the diameter $D_2$ is less than the diameter $D_1$, as shown in FIG. 1A and no subsequent adjustment of the clamp is possible. FIG. 1C shows the conventional clamp tightened to the maximum to the extent that the hose is damaged.

With reference to FIGS. 2A and 2B, there is illustrated the clamp 10 of the present invention. While this figure shows one embodiment of a clamp having a single length of wire formed into a double loop 11, the present invention is applicable to a wide variety of hose clamps, ducts, boots/covers and the like. The wire also forms a pair of spaced loops 12 and a helix 13. A threaded screw 14 is inserted through the helix 13, so that the head of the screw 14 is engaged by the helix 13; and the body of the screw extends through the helix 13. A nut 15 having ears on either side is received in the spaced loops 12, and the threaded body of the screw 14 cooperates with the threaded opening in the nut 15.

A spacer 16, having a pair of resilient legs 17 which partially define a cylindrical bore, is engaged on the body of the screw 14 by a "snap-fit" (FIG. 3). The spacer 16 has a forward face 18 and a rearward face 19. The forward face 18 engages the nut 15. When the screw 14 is turned in a closing direction, as with a screw driver, the helix 13 is moved towards the rearward face 18 of the spacer 16 until the two engage one another. This limits the movement of the helix 13 and in this position, the diameter of the clamp 10 is reproducibly defined and is consistent in all clamps which include the spacer 16.

An alternate conventional procedure is to apply a torque of 30–38 in. lb. As indicated supra, a study of approximately 4000 screws and nuts indicated a wide variability of force applied and a resulting wide variability of the "gap" and the diameter of the clamp.

Hose compressibility was evaluated in terms of how much force does it take to close a clamp. The test were performed on standard $1\frac{1}{2}''$ (I.D.) ethylene propylene diene monomer (EPDM) radiator-hose, using both "fresh" and "aged" (1 yr. min.) samples. For comparison the new FORD "World-Class" hose compound was also tested. The following table shows the amount of force required to bottom-out a properly sized clamp:

| | |
|---|---|
| "Aged" EPDM | 520 lbs. |
| "Fresh" EPDM | 407 lbs. |
| "World-Class" | 265 lbs. |

The test fixture and data obtained are shown in FIG. 4.

FIGS. 5-7 show the spacer 16 which engages the body of the screw 14. The legs 17 partially define a cylindrical bore to snap over the body of the screw 14 (FIG. 3). A tab 20 extends outwardly from the forward face 18 of the spacer 16 and is disposed between the spaced loops 12. The tab 20, when so disposed, provides resistance to rotation of the spacer 16. The tab 20 also serves as a means for removal of the spacer 16 from the screw body 14 (FIG. 8) and the clamp 11. As shown in FIGS. 5 and 6, the spacer 16 also has a depression 21 in the rearward face 19 enabling a user to place an instrument, such as a blade of a screw driver, into the depression 21 to assist in removing the spacer 16 from the clamp 11. By having both the tab 20 and the depression 21, the user may more readily remove the spacer 16 in those installations in which the hose clamp is accessible from only one direction. The spacer 16 is preferably fabricated from a plastic material which has sufficient rigidity to maintain space between the helix 13 and the nut 15 when the screw 14 is turned in a fully closed direction and has sufficient resiliency so that the legs 16 may form a snap fit about the body of the screw 14. Delrin ® 500 R, made by Dupont, has been found to have these characteristics, but other materials may be used.

FIG. 9 illustrates the clamp 11 with the screw 14 in a fully opened position. Placement of the spacer 16 on screw 14 and engaging the spaced loops 12 is shown. The forward face 18 of the spacer 16 is disposed so as to engage the nut 15. When the spacer 16 is so disposed, rotation of the screw 14 with or without a torque wrench, will close the clamp 10 until the helix 13 engages the rearward face 19 of the spacer 16. This will assure that the diameter of the clamp 11 is reproducible and consistent and, consequently, the hose is secured to the conduit to prevent leakage independent of torque, operator technique, screw/nut relative efficiency and condition of the hose.

A further advantage to be obtained by use of the present invention is that the user and quality assurance personnel can inspect to see that the installation is correct. Also, the spacer 16 can be easily removed to allow on-line or field adjustments. This is an important consideration for sand cast fittings which are sometimes difficult to seal. In addition, the spacer 16 provides positive protection against loss of screws 14 due to vibration and similar movement during transit and handling. The spacer 16 snaps onto the screw 14 with sufficient force to prevent loss of the screw while increasing the free torque by only about 1-2 in. lbs. The spacer 16 may be available in various colors to provide a visual aid for inspection or other situations in which identification is desirable.

It will be appreciated by those skilled in the art that the present invention has broad applications to clamps for materials other than hoses. For example, clamps used on engine air intake ducts, boots for rack and pinion steering and boots for constant velocity joints, to identify a few applications, also employ clamps in which the user wants to assure a reproducible closure and a simple inspection technique.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In combination with a hose clamp including a loop fitted over a hose received on a conduit or the like, wherein the hose clamp includes a radially-projecting portion and further includes a nut retained on the hose clamp and receiving a screw passing through the radially-projecting portion substantially tangentially of the loop, a means to prevent over-tightening or under-tightening of the screw and hence preventing damage to the hose or leakage between the hose and the conduit, respectively, comprising a spacer carried by the screw and disposed between the radially projecting portion of the hose clamp and the nut retained therein, the spacer having means thereon to prevent rotation with respect to the screw, the spacer having a pair of leg means which straddle the screw, such that the spacer is laterally removably mounted on the screw after the screw has been received through the radially-projecting portion of the hose clamp and has engaged the nut; whereby, as the screw is tightened in the nut, the spacer becomes rigidly lodged between the nut and the radially-projecting portion of the hose clamp, thereby providing a stop which limits the further tightening of the screw and hence limits the further closure of the loop on the hose fitted on the conduit, thereby assuring that the loop will be closed over the hose to a substantially uniform diameter, and thereby assuring that the hose will not be damaged by over-tightening of the screw, nor will leakage occur between the hose and the conduit due to under-tightening of the screw.

2. In combination with a hose clamp including a loop fitted over a hose received on a conduit or the like, wherein the hose clamp includes a radially-projecting portion and further includes a nut retained on the hose clamp and receiving a screw passing through the radially-projecting portion substantially tangentially of the loop, a means to prevent over-tightening or under-tightening of the screw and hence preventing damage to the hose or leakage between the hose and the conduit, respectively, comprising a spacer carried by the screw and disposed between the radially projecting portion of the hose clamp and the nut retained therein, the spacer having a pair of leg means which straddle the screw, such that the spacer is removably mounted on the screw after the screw has been received through the radially-projecting portion of the hose clamp and has engaged the nut; whereby, as the screw is tightened in the nut, the spacer becomes rigidly lodged between the nut and the radially-projecting portion of the hose clamp, thereby providing a stop which limits the further tightening of the screw and hence limits the further closure of the loop on the hose fitted on the conduit, thereby assuring that the loop will be closed over the hose to a substantially uniform diameter, and thereby assuring that the hose will not be damaged by over-tightening of the screw, nor will leakage occur between the hose and the conduit due to under-tightening of the screw and,
   wherein the hose clamp includes a pair of loops on either side of the nut, the nut having respective laterally-projecting ears received in the loops, respectively, and wherein the spacer has a forwardly-projecting tab received between the pair of loops and on top of the nut, thereby positioning the spacer on the hose clamp, and whereby the tab is engaged to lift the spacer off the hose clamp.

3. A clamp to retain a hose on a conduit comprising:
   a body section forming a closed loop having a diameter, the body section having a radially projecting portion, a screw having a threaded body and a head, the head of the screw received by the radially projecting portion and bearing on the portion;
   the closed loop further having a nut means attached to the loop and spaced apart from the projecting portion, the nut means cooperating with the threaded body of the screw such that rotation of the screw in a closing direction moves the projecting portion and the head of the screw towards the nut means and reduces the diameter of the loop;
   a spacer removably carried by the body of the screw between the projecting portion and the nut means, the spacer having means thereon to assist in removal of the spacer from the clamp, the spacer having means thereon to prevent rotation of the spacer with respect to the screw, the spacer disposed adjacent to the nut means such that when the screw is rotated in a closing direction, the head of the screw and the projecting portion of the body section on which the head of the screw bears are moved to engage the spacer to limit further movement of the projecting portion and to reproducibly define the diameter of the closed loop, such that the hose is securely retained to prevent leakage caused by the diameter being substantially larger than the hose, or to prevent damage to the hose caused by the diameter being substantially smaller than the hose.

4. The clamp of claim 3, further comprising the spacer removably carried by the screw having a pair of resilient legs which partially define a cylindrical bore such that the legs straddle the body of the screw.

5. The clamp of claim 4, wherein the spacer removably carried by the body of the screw engages the body of the screw with a snap fit, such that the spacer is easily and rapidly installed and is removed for subsequent readjustment of the screw if desired without removing the screw from engagement with the nut means, and whereby the spacer further serves to prevent loss of the screw during transit and handling.

6. The clamp of claim 4, wherein the spacer has a forward face and a rearward face, and when the spacer is carried by the body of the screw, the forward face is adjacent to the nut means; and wherein when the screw is turned in a closing direction, the projecting portion of the body section is adjacent to the rearward face of the spacer to limit further movement of the body section, such that the spacer serves as a visual reference to indicate reproducible closure of the clamp on the hose.

7. The clamp of claim 4, further comprising a depression in the rearward face of the spacer removably carried by the body of the screw such that an instrument inserted therein assists in removal of the spacer from the clamp.

8. A clamp to retain a hose on a conduit comprising:
a body section forming a closed loop having a diameter, the body section having a radially projecting portion, a screw having a threaded body and a head, the head of the screw received by the radially projecting portion and bearing on the portion;
the closed loop further having a nut means attached to the loop and spaced apart from the projecting portion, the nut means cooperating with the threaded body of the screw such that rotation of the screw in a closing direction moves the projecting portion and the head of the screw towards the nut means and reduces the diameter of the loop;
a spacer removably carried by the body of the screw between the projecting portion and the nut means, disposed adjacent to the nut means such that when the screw is rotated in a closing direction, the head of the screw and the projecting portion of the body section on which the head of the screw bears are moved to engage the spacer to limit further movement of the projecting portion and to reproducibly define the diameter of the closed loop, such that the hose is securely retained to prevent leakage caused by the diameter being substantially larger than the hose, or to prevent damage to the hose caused by the diameter being substantially smaller than the hose;

the clamp further comprising the spacer removably carried by the screw having a pair of resilient legs which partially define a cylindrical bore such that the legs straddle the body of the screw and
wherein the nut means is attached between a pair of upwardly extending protrusions from the loop;
the spacer removably carried by the body of the screw further having an extension tab extending outwardly from the forward face of the spacer such that the tab is disposed between the upwardly extending protrusions from the loop to provide resistance to rotation of the spacer; and
the tab further serving as a means for removal of the spacer from the clamp.

9. A clamp to retain a hose on a conduit comprising:
a body section forming a closed loop having a diameter, the body section having a radially projecting portion, a screw having a threaded body and a head, the head of the screw received by the radially projecting portion and bearing on the portion; the closed loop further having a pair of upwardly extending protrusions spaced apart from the projecting portion a nut means received between the protrusions, the nut means cooperating with the threaded body of the screw such that rotation of the screw in a closing direction moves the projecting portion and the head of the screw towards the nut means and reduces the diameter of the loop;
a spacer removably carried by the body of the screw, disposed adjacent to the nut means such that when the screw is rotated in a closing direction, the head of the screw and the projecting portion of the body section on which the head of the screw bears are moved engage the spacer to limit further movement of the end of the projecting portion and to reproducibly define the diameter of the closed loop such that the hose is securely retained to prevent leakage caused by the diameter being substantially larger than the hose, and to prevent damage to the hose caused by the diameter being substantially smaller than the hose; the spacer removably carried by the screw having a pair of resilient legs which partially define a cylindrical bore such that the legs straddle the body of the screw with a snap fit such that the spacer is easily and rapidly installed and is removed for subsequent readjustment of the screw if desired without removing the screw from engagement with the nut means, the spacer further serving to prevent loss of the screw during transit and handling; the spacer further having a forward face and a rearward face, and when the spacer is carried by the body of the screw, the forward face is adjacent to the nut means and when the screw is turned in a closing direction, the projecting portion of the body section is adjacent to the rearward face of the spacer to limit further movement of the body portion; the spacer serving as a visual reference to indicate reproducible closure of the clamp on the bore;
the spacer further having an extension tab extending outwardly from the forward face of the spacer such that the tab is disposed between the upwardly extending protrusion from the loop to provide resistance to rotation of the spacer; and the tab further serving as a means for removal of the spacer from the clamp; the spacer further having a depression in the rearward face of the spacer such that an instrument inserted therein assists in removal of the spacer from the clamp.

10. A clamp to retain a hose on a conduit comprising:
a single length of wire formed into a double loop, the wire having a helix, a screw having a threaded body and a head, the head being received in and bearing upon the helix, the wire further having a pair of spaced loops, a nut means received between the spaced loops, the threaded body of the screw cooperating with the nut means such that rotation of the screw in a closing direction moves the helix towards the nut means and reduces the diameter of the loop; and
a spacer removably carried by the body of the screw disposed adjacent to the nut means the spacer being laterally installable on and removable from the screw when the screw is threadably engaged with the nut means and the clamp is retaining the hose on the conduit, such that when the screw is rotated in a closing direction, the head of the screw and the helix on which the head of the screw bears are moved to engage the spacer to limit further movement of the projecting portion and to reproducibly define the diameter of the closed loop such that the hose is securely retained to prevent leakage caused by the diameter being substantially larger than the hose and to prevent damage to the hose caused by the diameter being substantially smaller than the hose.

* * * * *